United States Patent [19]
Zimmerman et al.

[11] 3,839,911
[45] Oct. 8, 1974

[54] FLUID FLOW METERING METHOD AND SYSTEM

[75] Inventors: Carl W. Zimmerman; George V. Copland, both of Ducan, Okla.

[73] Assignee: Halliburton Company, Duncan, Okla.

[22] Filed: Aug. 11, 1971

[21] Appl. No.: 170,993

Related U.S. Application Data

[63] Continuation of Ser. No. 20,645, March 18, 1970, abandoned.

[52] U.S. Cl. ........ 73/194 E, 73/231 M, 235/151.34
[51] Int. Cl. .............................................. G01f 1/00
[58] Field of Search ......... 73/194 E, 194 A, 194 M, 73/194 R, 194 EM, 231 M, 32, 24, 61.1; 235/151.33, 151.34, 151.35, 150.3, 150.52, 92 FL, 92 WT, 92 FQ; 177/16; 324/78 D

[56] References Cited
UNITED STATES PATENTS

| | | | |
|---|---|---|---|
| 2,651,204 | 9/1953 | Dickinson | 73/398 C |
| 3,043,508 | 7/1962 | Wright | 235/151 |
| 3,176,514 | 4/1965 | Foster | 73/229 |
| 3,184,975 | 5/1965 | Lindemann et al. | 73/229 X |
| 3,385,108 | 5/1968 | Rosso | 73/194 R |
| 3,390,731 | 7/1968 | Schierbeek | 177/16 |
| 3,425,274 | 2/1969 | Clement | 73/194 M |
| 3,610,898 | 10/1971 | Yamamoto et al. | 235/151.34 |

*Primary Examiner*—Charles A. Ruehl
*Attorney, Agent, or Firm*—Burns, Doane, Swecker & Mathis

[57] ABSTRACT

A fluid flow metering method and system using digital signals and logic for producing a compensated manifestation of fluid flow by the mathematical multiplication of two or more sensed parameters, one parameter being a fluid flow rate and the other one or more parameters being related to a condition of the fluid such as its constituency, pressure, density, dielectric constant, temperature or the like, where the parameters are represented by series of electrical pulses and where the frequency of one of the series of electrical pulses varies reciprocally to the parameter sensed.

54 Claims, 9 Drawing Figures

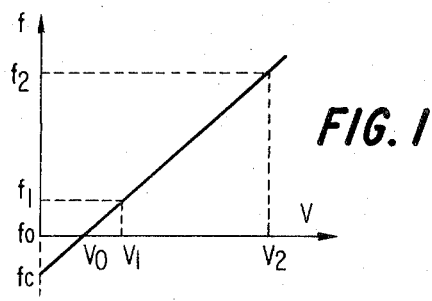
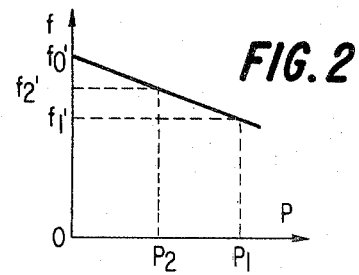
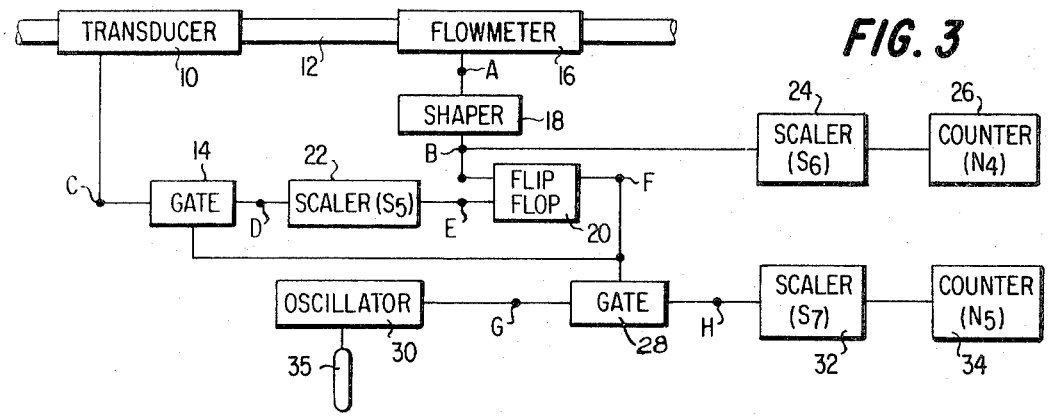
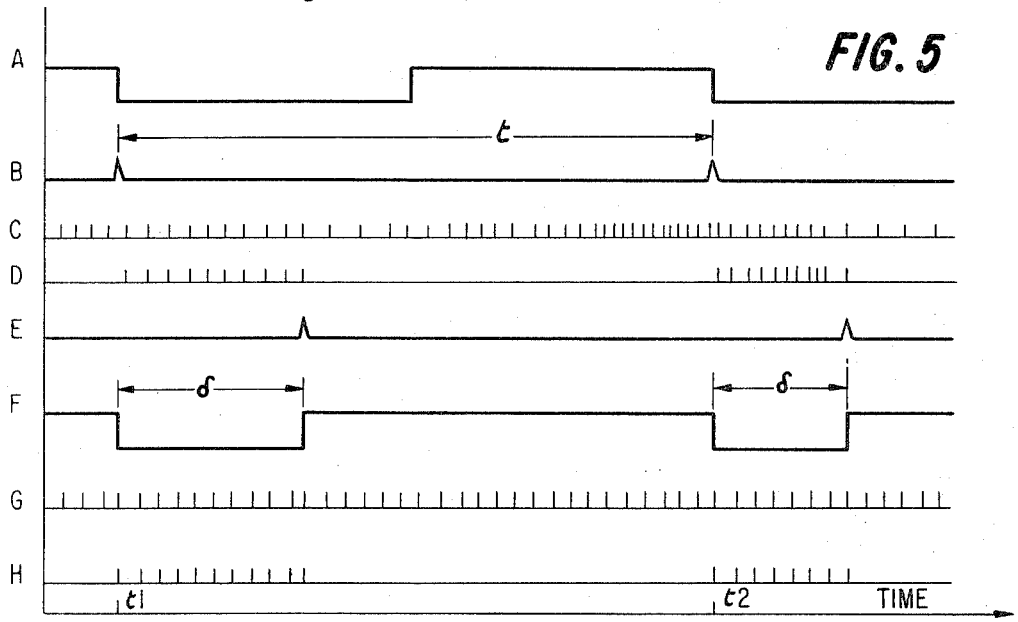
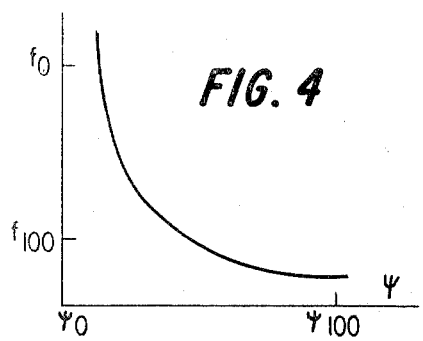
INVENTORS
CARL W. ZIMMERMAN
GEORGE V. COPELAND

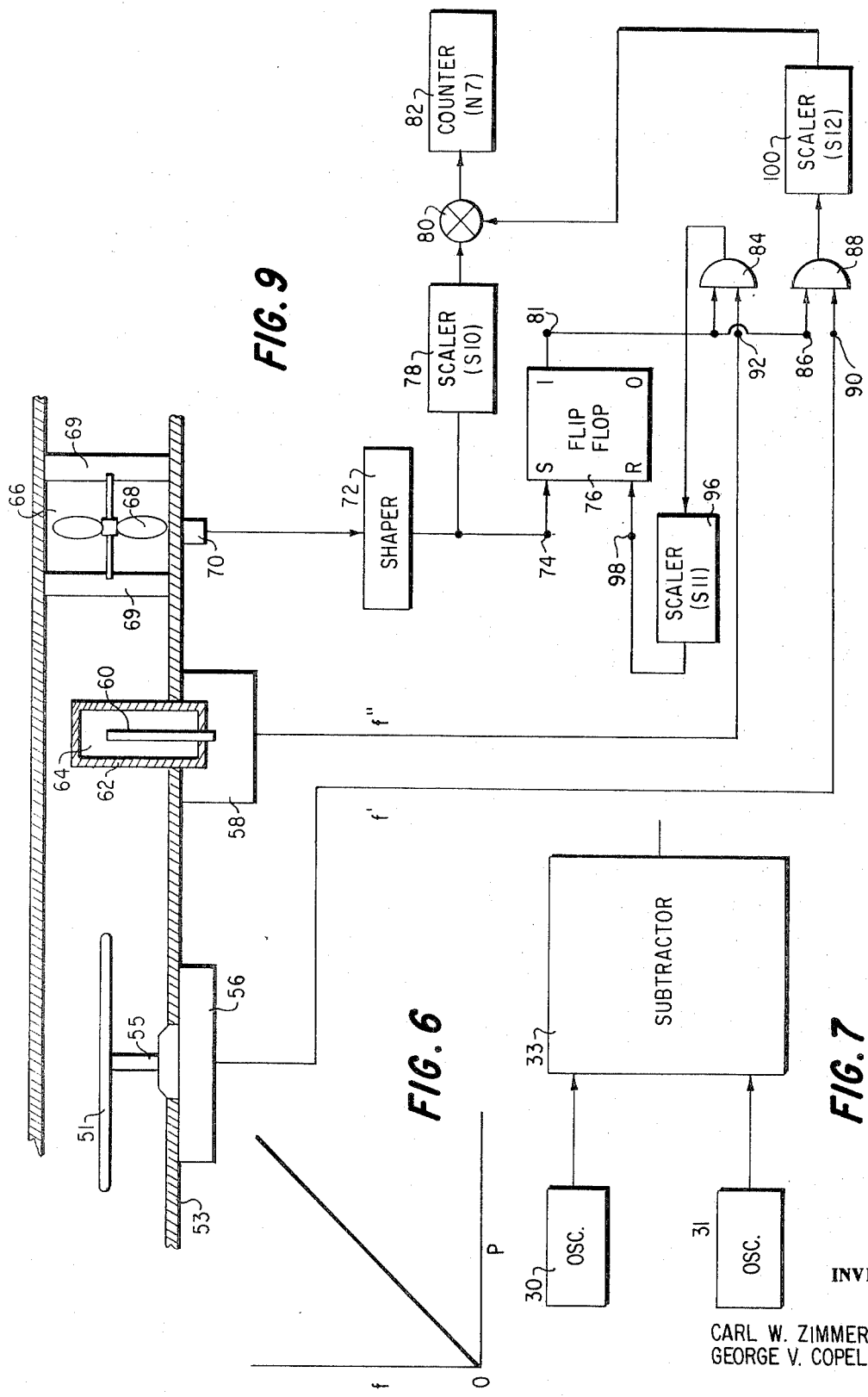

INVENTORS
CARL W. ZIMMERMAN
GEORGE V. COPELAND

BY
Burns, Doane, Benedict, Swecker & Mathis
ATTORNEYS

FLUID FLOW METERING METHOD AND SYSTEM

RELATED APPLICATIONS

This application is a continuation of application Ser. No. 20,645, now abandoned, said application Ser. No. 20,645 being a continuation-in-part of copending application Ser. No. 750,675 filed July 5, 1968 for "Fluid Flow Metering Method and System," said application Ser. No. 750,675 being a continuation-in-part of then copending application Ser. No. 704,403 filed Feb. 9, 1968 for "Fluid Flow Measuring Method and System," and now abandoned. Said application Ser. No. 750,675 issued as Pat. No. 3,566,685 on Mar. 2, 1971.

BACKGROUND OF THE INVENTION

As has been described and claimed in the related applications cited supra, and herein incorporated by reference, fluid flow rate responsive pulses may be used to pass packets of fluid condition responsive pulses to appropriate scaling and counting apparatus, the number of pulses in each packet being directly related to the condition of the fluid being sensed. The number of pulses accumulated can be made to vary in a manner related to the frequency response curve of the transducer utilized to sense the fluid condition. The frequency response curve of the transducer may increase or decrease with a change in the condition sensed as appropriate for the result desired.

A different circuit arrangement may, however, be desired when the frequency of the transducer varies reciprocally with the condition for which compensation is to be made, i.e., a reciprocal function must be used in producing the incremental mathematical multiplication product. In this event, the circuit is modified so that the flowmeter pulse commenced gating time interval has a duration determined by the accumulation of a predetermined number of pulses from the condition responsive transducer. The actual pulses in the packets applied to the accumulator register, i.e., those occurring during this time interval, may be provided from a separate oscillator having a frequency sufficiently high to give the desired resolution. By causing the separate oscillator frequency to vary in accord with a further condition of the fluid, the manifestation of fluid flow may be further compensated in a comprehensive measuring system.

The dielectric constant of an oil/water emulsion is also a function of the temperature of the oil. This is particularly important in the metering of treated crude oil into a sales pipeline where the percentage of oil in the emulsion is quite high.

Yet a further object of the present invention is to provide a novel method and system for compensating a high resolution net oil analyzer of the capacitance probe type for the effect of temperature on the dielectric constant of the oil.

An object of the invention resides in providing a novel flow measuring method and circuit for flowmeter compensation involving a reciprocal multiplication function.

Another object is to provide a novel method and system employing a subtraction process whereby the flow pulses and the pulses in the pulse packets are subtracted from one another through suitable scalers to provide a direct reading compensated manifestation in the same units as are used in registering gross fluid flow.

These and other objects and advantages will be apparent from the claims and from the following detailed description when read in conjunction with the appended drawings.

THE DRAWINGS

FIG. 1 is a graph illustrating the relationship of volumetric flow rate and the frequency response of the flowmeter;

FIG. 2 is a graph illustrating the relationship of absolute pressure and the frequency response of a pressure transducer used to modify the manifestation of volumetric gas flow rate;

FIG. 3 is a functional block diagram illustrating a system for producing an incremental mathematical multiplication product involving a reciprocal function;

FIG. 4 is a graph illustrating the transducer output signal frequency and a variable condition of the flow stream as detected by the transducer where the frequency varies as a reciprocal of the condition sensed;

FIG. 5 is a timing diagram showing voltage waveforms at various points identified on the block diagram of FIG. 3;

FIG. 6 is a graph illustrating the desired frequency response curve of the transducer;

FIG. 7 is a schematic diagram of a circuit for performing the correction;

FIG. 9 is a functional block diagram of a high resolution net oil analyzer which compensates for the effects of temperature on the dielectric constant of the oil in the oil/water fluid emulsion.

THE DETAILED DESCRIPTION

Figure 8:
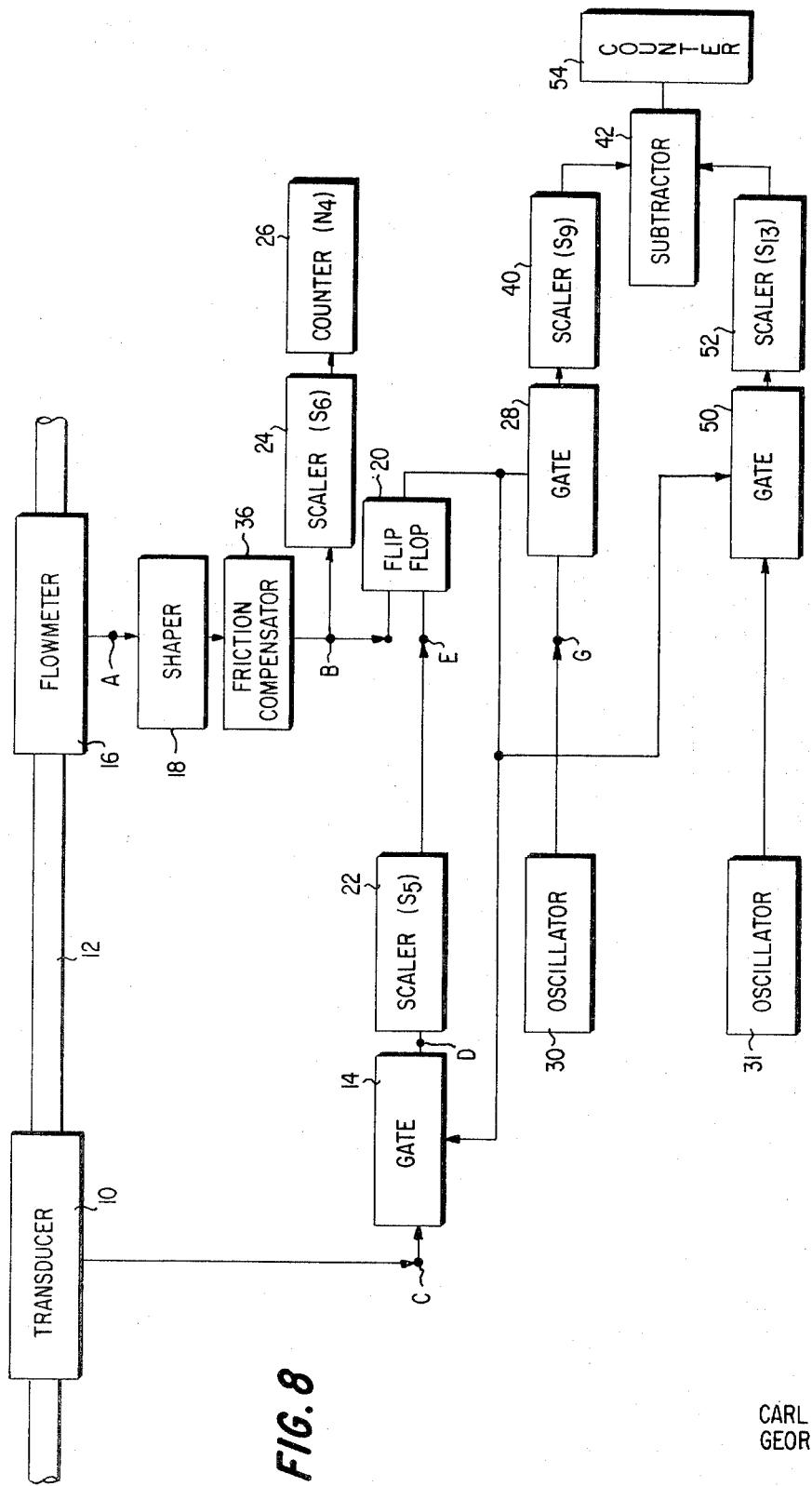
FIG. 8 is a functional block diagram of a further embodiment of the system of FIG. 3 which produces a directly readable manifestation of the compensated flowmeter signal.

The present invention has particular utility in producing oil wells as a system for producing a compensated gas flowmeter corrected for rapid fluctuations in pressure, the system being installed in the gas flow conduit of a liquid-gas separator at the wellhead, and in a high resolution net oil analyzer for compensating for the effects of temperature on the dielectric constant of the oil in the oil/water emulsion.

In such systems, the frequency response of the flowmeter may vary as illustrated in the graph of FIG. 1, where the frequency $f$ of the flowmeter is plotted along the Y axis and the volumetric flow rate V is plotted along the X axis, the frequency $fc$ being an offset relating to bearing friction.

The frequency response of the pressure sensitive transducer in a gas system may vary as illustrated in FIG. 2 where the frequency of the transducer is plotted against absolute pressure.

Where, as illustrated in FIG. 4, the frequency response curve of the transducer varies in a reciprocal manner to the condition of the fluid for which compensation is to be made, it is necessary to adopt the system and method embodied in FIG. 3. The reciprocally varying function may, of course, be an increasing or decreasing one depending upon the compensation desired.

The embodiment of FIG. 3 may also be used where it is desired to have the number of pulses accumulated vary in an inverse manner to a condition of the fluid for which the frequency response curve of the condition transducer responsive is directly related. Here again, the frequency response curve of the transducer may be an increasing or decreasing one depending upon the compensation desired.

As in the system disclosed in the aforementioned related applications, the reciprocal multiplication embodiment also produces packets of pulses wherein the precise number of pulses is related to the condition of the fluid by which the flowmeter output is to be modified and the number of packets is related to fluid flow.

In the embodiment of FIG. 3, transducer 10 may be an oscillator having a temperature sensitive probe and flowmeter 16 a conventional gas meter.

The electrical output signal from an oscillator, here regarded as being a portion of the transducer 10, is fed to one input terminal C of gate 14 after shaping in conventional pulse shaping circuitry (not shown). These pulses are selectively gated in a manner to be hereinafter described in accordance with the enabling of gate 14 by the output of a flip-flop 20 and are accumulated in scaler 22. Scaler 22 effectively divides the pulses applied to input terminal D, and after receiving a predetermined specific number of input pulses, produces a single output pulse which is applied at the reset input terminal E of flip-flip 20.

A voltage output signal from the flowmeter 16 is fed to a shaper 18 and from shaper 18 to scaler 24 and counter 26. Counter 26 provides a manifestation related to total flow.

The circuitry of shaper 18 is conventional and is designed to provide a steep wavefront triggering pulse suitable for operating scaler 24 and the bistable multivibrator or flip-flop 20. An output voltage level on the set output terminal F of flip-flop 20 continues until a pulse is received on the reset input terminal E from scaler 22. The flip-flop 20 output pulse is used as an enabling signal for gates 14 and 28.

It is necessary that the maximum duration of the flip-flop 20 output pulse be less than the minimum time between successive pulses from flowmeter 16 at maximum flow rate so that no flowmeter pulse is missed. On the other hand, the pulse must have a duration sufficiently long relative to the frequencies of both the signal from transducer 10 and the frequency of oscillator 30 to allow the passage of a sufficient number of pulses from oscillator 30 to scaler 32 to achieve the desired accuracy.

The actual duration of the output pulses from flip-flop 20 which serves as the enabling pulse for both of gates 14 and 28 depends upon the frequency of the output signal from transducer 10 and is determined after receipt of a fixed number of output pulses from transducer 10. Since this pulse rate may vary form between about 0.8 and 1 MHz, a suitable gate width may include 200 pulses for example. The frequency of the oscillator 30 signal may be on the order of 1 MHz. Thus, the precise number of pulses passed by gate 28 for each gating period is determined by the precise duration of the gating period, the duration being variable and reciprocally related to the frequency of the output signal from transducer 10. The output pulses from scaler 32 are a submultiple of the pulses applied to terminal H and are accumulated in counter 34.

The waveforms illustrated in FIG. 5 are those appearing at correspondingly labeled terminals in FIG. 3. The output signal from flowmeter 16 is generated directly or shaped to have the substantially square wave of waveform A, the frequency being related to fluid flow. An incremental integration period $t_1$ to $t_2$ is determined by successive negative going or trailing edges of each positive pulse of waveform A. The output pulse from shaper 18 at terminal B of FIG. 3 is illustrated as waveform B and is used to trigger bistable multivibrator or flip-flop 20 to produce the enabling signals for gates 14 and 28. The enabling signals have a duration δ and are illustrated in waveform F of FIG. 5.

The output of transducer 10 is illustrated as waveform C and is applied to input terminal C of gate 14 in FIG. 3. The presence of an enabling pulse (waveform F) allows the pulses in waveform C to be passed by gate 14 to the output terminal D as illustrated in waveform D. The number of applied pulses necessary to generate an output from scaler 22 is determined by the scaling factor $S_5$.

The output of the flowmeter 16 may be a train of pulses having a frequency or recurrence rate related to the rate of fluid flow through conduit 12. The relative frequency or recurrence rate of the transducer 10 output pulses must be quite high with respect to the output of the flowmeter 16 to achieve satisfactory accuracy. This can be accomplished easily either by the design of the transducer 10 and flowmeter 16 or by the use of a suitable scaler (not shown) between the flowmeter 16 and flip-flop 20.

The output signal from transducer 10 which is applied to terminal C of gate 14 in FIG. 3 is a train of pulses having a frequency or recurrence rate related to a condition of the fluid flowing in conduit 12. Commencing with the instant when gate 14 is enabled, a series of pulses, such as for example 200, is passed to scaler 22 before an output signal is applied to the reset input terminal E of flip-flop 20 thus removing the enabling pulse from gate 14. Flip-flop 20 remains in this condition until again set by the receipt of a flow pulse from flowmeter 16.

Oscillator 30 generates a series of equally spaced pulses as illustrated in waveform G of FIG. 5. These pulses are applied to input terminal G of gate 28, which passes the applied pulses to scaler 32 only during the duration of time when gate 28 is enabled by the output of flip-flop 20.

It is desirable, for reasons of accuracy, to have at least ten, and preferably several scores or hundreds of pulses appear at the output of terminal H of gate 28 in each gated period.

In summary a pulse from the shaper 18 will set flip-flop 20 to enable gates 14 and 28. The train of pulses from the condition responsive transducer 10 applied to terminal C of gate 14 are passed through gate 14 to scaler 22 until a predetermined specific count is reached, at which time the output from scaler 22 will reset flip-flop 20. This removes the enabling potential from gates 14 and 28 until the application of the next flow responsive pulse from shaper 18 on the set input terminal B of flip-flop 20.

During the period between the setting of the flip-flop 20 by a pulse from shaper 18 and the accumulation of a sufficient number of pulses from the variable condition responsive transducer 10 in scaler 22 to reset the flip-flop 20, the frequency output of oscillator 30 is fed through gate 28 to scaler 32. The period of time δ during which gate 28 is enabled is thus:

$$\delta = S_5/f \quad (1)$$

where δ is the gate width, $S_5$ is the scaling factor of scaler 22 and $f$ is the output frequency of the transducer 10.

The scaling factor $S_5$ must be chosen so that the enabling period or gate width δ of gate 28 is always less than the period between the arrival of successive flow responsive pulses from shaper 18.

The number of pulses N from oscillator 30 passing through gate 28 to scaler 32 during this period is $$N = (S_5) f_0/f \quad (2)$$

where $f_0$ is the frequency of oscillator 30.

The pulses accumulated in scaler 32 are thus equal to the scaling factor $S_5$ of scaler 22 multiplied by the frequency $f_0$ of oscillator 30 and divided by the output frequency $f$ of the condition responsive transducer 10.

The same relationships hold where the frequency response curve of the transducer 10 varies in a direct manner with the condition of the fluid but where division rather than multiplication is required to perform the desired compensation.

In the foregoing discussion of the circuit of FIG. 3, the oscillator 30 has been described as having a constant frequency output. However, from equation (2) it is evident that the frequency output of oscillator 30 may be made to vary in response to some other parameter or physical condition, such as pressure, of the fluid flowing through conduit 12. A pressure probe 35 is illustrated in FIG. 3.

The circuit of FIG. 3 thus provides a system where the flowmeter 16 output may be compensated for two different variable conditions of the fluid, one being where the frequency varies as a reciprocal of a relevant variable condition and the other where the frequency varies directly with a second relevant condition. In a gas measuring system, transducer 10 may be temperature sensitive and oscillator 230 through pressure probe may be made pressure sensitive.

In the foregoing description the frequency versus pressure characteristic of the oscillator 30 should preferably be as shown in FIG. 6 where the curve has no zero offset, i.e. passes through the intersection of the axis of the graph. In the event that the transducer utilized does not provide a curve of this characteristic, the desired characteristic can be achieved from a transducer 10 having an offset by using the arrangement of FIG. 7, where the oscillator 31 is an oscillator generating a fixed frequency equal to $f_0'$ shown in FIG. 2, and where subtractor 33 may be a conventional up-down counter, or of the type described in the aforementioned related applications. The frequency of the output signal from the subtractor 33 is the difference in the frequencies of the signals from oscillators 30 and 31.

Performing the subtraction prior to the forming of a pulse packet by gate 28 places a limitation on this embodiment at very low pressures when the frequency difference between oscillators 30 and 31 is near zero, as there may be insufficient pulses in each packet to obtain good resolution and accuracy under this condition. This limitation may be overcome in the embodiment illustrated in the functional block diagram of FIG. 8.

In the embodiment of FIG. 8, the calculations necessary to provide a manifestation compensated to correct for the condition of the fluid are performed through logic and a directly readable compensated manifestation of the gross fluid flow obtained. The same reference designations have been used for corresponding parts to facilitate a comparison with FIG. 3.

With reference to FIG. 8, the same transducer 10, flow channel 12 and flowmeter 16 may be used as in the embodiment of FIG. 3. The output terminal of shaper 18 is shown connected through a friction compensator 36 of the type illustrated in the aforementioned copending application to flip-flop 20 which supplies the enabling pulses to gate 14 and to gate 28 which passes the packets of the high frequency pulses applied to terminal G from oscillator 30.

The flip-flop 20 also supplies enabling pulses to gate 50 which passes packets of high frequency pulses from oscillator 31 through a scaler 52 to the subtractor 42. The output signal from scaler 52 and the output of scaler 40 are connected to the subtractor 42 which provides an output signal to counter 54 that corresponds to a difference between the input signals from scalers 40 and 52.

A flowmeter bearing friction compensator 36 may be connected between shaper 18 and flip-flop 20 in those applications where meter friction losses are significant. A suitable circuit is illustrated in the aforementioned related application.

In the direct reading embodiment of FIG. 8, the counter 54 is conventional in operation. The subtractor 42 may likewise be a conventional up-down counter or the like, or it may, as in the preferred embodiment, consist of the circuit described in the aforementioned related applications.

In this embodiment, separate pulse packets having the same time duration are formed from the outputs of oscillators 30 and 31 as a result of the gates 28 and 50 being enabled by the same enabling voltage from the flip-flop 20.

The pulse packets from gate 28 are fed into the scaler 40 having a scaling factor $S_9$, the pulse packets from gate 50 are fed into scaler 52 having a scaling factor of $S_{13}$. The outputs of scalers 40 and 52 are applied to subtractor 42, the output signal from which is the difference between the number of pulses arriving at its separate input terminals. If the scaling factors $S_9$ and $S_{13}$ are both made equal to one, the number of pulses per packet from the subtractor 42 will be equal to the product of δ, the time duration of the packet, and the difference between the frequencies of the signals from the oscillators 30 and 31.

In practice, the oscillator 31 can be set to generate a signal having fixed frequency equal to $f_0'$ shown on FIG. 2. The difference between the frequencies of the signals from the oscillators 30 and 31 thus varies from zero to $(f_0'-f_1')$ as the pressure varies from zero to $P_1$. There is therefore always a large number of pulses (more than 400) within each of the pulse packets from the gates 28 and 50 so that good resolution and accuracy may be attained.

The number of pulses accumulated in the counter 54 during a gating interval when the scalers 40 and 52 each have unity factors is directly related to the difference between the frequencies of the signals from the pressure responsive oscillator 30 and the fixed frequency oscillator 31. This difference in frequency, in turn, is directly related to the pressure as explained supra. Hence, the number of pulses accumulated in the counter 54 over a period of time is a manifestation of the quantity of fluid passed by the flowmeter compensated for pressure. The number accumulated by the counter 54, however, is not in convenient units of measure unless the scaling factors $S_9$ and $S_{13}$ are appropriately selected. Appropriate selection of these factors will cause the counter 54 to indicate in convenient units the total volume of gas flow compensated for pressure.

For the condition when the oscillator 31 is adjusted to have a frequency equal to $f_o'$, the scaling factor $S_{13}$ may be adjusted to equal that of the scaling factor $S_9$. It is, however, convenient to use a crystal oscillator operating at a frequency in the low MHz range (typically 1MHz) for the oscillator 31 to obtain good stability at low cost. In this instance, the frequency of the signal from the oscillator must be passed through a scaler to make it equal to $f_o'$. Such a scaler can be combined as part of the scaler 52 following the gate 50 or it can be placed between oscillator 31 and gate 52.

The embodiment shown in FIG. 8 thus provides a direct reading gas measuring system which is further compensated for temperature changes in the flowing gas. For such a use the transducer 10 may be a temperature sensitive transducer having an output frequency which varies directly with changes in temperature and is linear over an operational range. A suitable transducer for this purpose may be of the type disclosed in the Fish et al application, Ser. No. 682,980, filed Dec. 2, 1967, which is assigned to the assignee of the present invention.

The oscillator 30 may form part of a pressure transducer with the same characteristics as described previously in conjunction with FIG. 2.

The scaling values for scalers 22, 52, and 40 may be calculated as follows:

$$S_5 = \delta f'_s \quad (3)$$

$$S_9 = [S_5 P_S (f_2' - f_1')(f_2 - f_1)/S f_s''(P_1 - P_2)(V_2 - V_1)] \quad (4)$$

and $$S_{13} = S_9 f'''/f_o' \quad (5)$$

where $f'_s$ is the output frequency of the temperature transducer at the standard temperature at which volumetric flow read out is desired, $S$ is the scaling value of a scaler (not shown) optionally used to reduce the frequency of the flow responsive pulses applied to the flip-flop 20, $P_S$ is a standard pressure of 14.7 psig, and the frequency of the oscillator 31 is $f'''$.

As indicated in equation (2) supra, $S$ must be greater than the gate width divided by the time $t$ indicated on the waveform of FIG. 5. The bearing friction compensating frequency may similarly be calculated by the equation $$f_c = V_1(f_2 - f_1) - f_1(V_2 - V_1)/V_2 - V_1 \quad (6)$$

By way of example, assume that the characteristics of the flowmeter at a constant line temperature and pressure are such that $f_2 = 2550$ Hz for a volumetric flow rate of 36,000 Cf/day and $f_1 = 255$ Hz for a volumetric flow rate of 3600 cf/day where the mean atmospheric pressure is 14.2 psia.

Ignoring bearing friction compensation for the moment by setting $f_c = 0$, assume a time interval between flowmeter pulses of 1/5000 seconds. Assume, also, that the frequency of the output signal from the pressure transducer $f'$ is 1000 Hz ($f_2'$) at zero psig and 800 Hz ($f_1'$) at 100 psig, and that the frequency of the output signal of the temperature transducer $f''$ varies from 920 Hz at 460°R to 1120 Hz at 560°R and is 1040 Hz at the standard temperature $f''_s$.

To register one pulse for each 100 cf of gas corrected to a standard pressure $P_s$ of 14.7 psia and a standard temperature $T_s$ of 60°F., select a nominal gating interval $\delta$ of 0.5 seconds.

From equation (3), $S_5 = (0.5)(1040) = 520$.

Since $S$ must be greater than the width of the gating pulse $\delta$ divided by the time $t$:

$$S > (0.5)(5,000) = 2500 \quad (7)$$

Selecting $S$ as 2,600 and solving equation (4), $S_9 = 3460$ where the quantity $(V_2 - V_1)$ in cf/day is divided by (100)(3600)(24) to correct to hundreds of cf/sec.

From equation (5) $S_9 = 3,460$ if $f'''$ is made equal to $f_o'$.

The actual value of the gating interval $\delta$ at a particular temperature may be determined from equation (3) to be $$\delta = S_5/f'' \quad (8)$$

From this equation (8), it can be seen that the gating interval varies reciprocally with the absolute temperature $f''$ in admitting pulses to the scaler 40. This is required by the gas law equation in which the volume $V_s$ varies reciprocally with the absolute temperature at a constant pressure.

$$V_s = PV/T \cdot T_s/P_s \quad (9)$$

where $V_s$ is the volume corrected to standard temperature and pressure and $T$ and $P$ are the instantaneous temperature and pressure of the gas.

To satisfy equation (9), the pressure $P$ must vary directly with volume $V_s$ at a constant temperature. Since the gate width $\delta$ is a constant at a constant temperature (see equation (8)) the pulses accumulated in counter 54 will be directly related to the pressure as explained supra.

Bearing friction compensation may, of course, be made through the utilization of the circuit disclosed in the aforementioned application.

HIGH RESOLUTION NET OIL SYSTEM

The embodiment shown in FIG. 9 may also be adapted to provide temperature compensation in a net oil flow measuring system such as described supra. Temperature compensation is particularly important in metering treated crude oil into a sales pipeline where it is necessary to provide a high resolution analyzer. In such a situation, the percentage of water in the emulsion varies only from 0 to about 3 percent and it is a desideration to resolve the oil to the nearest 0.1 percent of the total liquid volume of the emulsion.

Referring now to FIG. 9, a capacitance probe 51 is coaxially disposed in a conduit 53 in a conventional manner by means of a supporting element 55. The capacitance probe 51 forms part of a transducer 56 which includes an oscillator having an output signal whose frequency $f'$ varies with the dielectric constant of the fluid emulsion flowing through the conduit 53 between the probe 51 and the internal walls of the conduit 53 which form the other plate of the capacitor.

The dielectric constant of the fluid emulsion is, as earlier explained, a function of the oil/water ratio of the emulsion and the frequency $f'$ of the output signal from the transducer 56 is thus related to the net oil in the fluid.

However, the dielectric constant of the oil also varies with changes in temperature. Any change in the temperature of the oil is thus reflected as a change in the frequency $f'$ of the output signal of the transducer which indicates a change in the oil/water ratio when none in fact exists. It is to effectively compensate for these temperature induced changes in the dielectric constant of the oil that the presently described system is designed.

A second transducer 58 is disposed in the conduit 53. This transducer 58 may include an oscillator similar in all respects to the oscillator of the net oil transducer 56. The transducer 58 may include a capacitance probe 60 coaxially disposed in a sealed cylindrical cell 62 which protrudes inwardly from the walls of the conduit 53 into a heat exchange relationship with the fluid emulsion flowing through the conduit 53. The interior 64 of the cell 62 may be filled with an oil or other substance having dielectric properties similar to the dielectric properties of the oil in the emulsion flowing in the conduit 53. The cell 62 constitutes the other electrode of the capacitor and may be constructed of any suitable material having sufficient rigidity to resist the forces which result from the flow of the fluid emulsion through conduit 53. It is important that the distance between the probe 60 and the cell 62 remain constant.

The frequency $f''$ of the output signal of the transducer 58 is also responsive through the capacitance to the dielectric constant of the oil between the probe 60 and the cell 62 in the same manner as the frequency $f'$ of the output signal of the transducer 56 is responsive to the percentage of oil in the fluid emulsion in the conduit 53. Inasmuch as the dielectric constant of the oil in the interior 64 of the cell 62 will vary only with changes in temperature, the frequency $f''$ of the output signal of the transducer 58 is solely responsive to temperature changes in the fluid emulsion flowing through the conduit 53.

Also disposed in conduit 53 may be a conventional flowmeter 66 having impeller 68 supporting vane assemblies 69, and a pick off unit 70 suitable for detecting the rotation of the impeller 68 in response to the flow of fluid through the conduit 53. The output signal of the flowmeter 66 constitutes a series of electrical pulses which may be shaped in a conventional wave shaper 72 and applied to the set input terminal 74 is of a simple R-S flip-flop 76. The output signal of the shaper 72 is also scaled in a scaler 78 and applied to a summing network 80.

The binary 1 output terminal 81 of the flip-flop 76 is connected to an input terminal of an AND gate 84 and to an input terminal 86 of an AND gate 88. The output signal of the transducer 56 is applied to the other input terminal 90 of the AND gate 88 and the output signal of the transducer 58 is applied to the other input terminal 92 of the AND gate 84.

The output signal of the AND gate 84 is scaled in a scaler 96 and applied to the reset input terminal 98 of the flip-flop 76. The output signal of the AND gate 88 is scaled in the scaler 100 and applied to the summing network 80. The summing network 80 may, for example, be the subtractor circuit earlier described. The output of the summing network 80 is applied to a conventional pulse counter 82.

Since the number of pulses $N$ passed by the AND gate 88 is a function of the gate width $\delta$ and the frequency $f'$ of the net oil transducer 56, $$N = \delta f' \tag{10}$$

and since $$\delta = S_{11}/f'' \tag{11}$$

where $S_{11}$ is the scaler value of scaler 96; then $$N = S_{11} f'/f'' \tag{12}$$

Since the frequency $f'$ of the output signal of the net oil transducer 56 is responsive to the oil/water ratio and to temperature and since the output of the transducer 58 is responsive solely to temperature in the same manner as the transducer 56 is responsive to temperature, the effects of temperature on the dielectric constant of the oil in the fluid emulsion flowing in the conduit 53 may be eliminated from the number of pulses applied to the scaler 100 and subsequently to the counter 82.

The scaler values $S_{10}$ and $S_{12}$ of scalers 78 and 100, respectively, may be determined in the same manner as the scaler values $S_3$ and $S_4$, respectively, as previously described in conjunction with FIG. 4 of the aforementioned related applications. The scaler value $S_{11}$ of scaler 96 may be found by means of the equation (3) where $f_2''$ is the frequency of the output signal of the temperature sensitive transducer 58 at a nominal temperature of the fluid emulsion in the conduit 53.

Drift compensation may also be provided for the present system if in addition the two transducers 56 and 58 are energized by the same voltage source. The resulting net oil determining system may thus be insensitive both to temperature and to variations in the power supply. A degree of resolution heretofore unachieved in the art is thus provided. By limiting the water cut of the fluid emulsion in the conduit 53 to about 3 percent, the system as above described has the capability to resolve the water cut to the nearest 0.1 percent of the total volume of the fluid emulsion in the conduit 53.

The present invention may thus be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for measuring fluid flow in a flow channel where both flow rate and a physical condition of the fluid may be variable, comprising the steps of:
   producing a first series of electrical pulses having a frequency related to fluid flow and varying up to a predetermined maximum;
   generating a second series of electrical pulses having a frequency related to a variable condition of the fluid, said second series of electrical pulses having a minimum frequency at least one order of magnitude greater than the maximum frequency of said first series of pulses;
   summing over a long period of time the incremental mathematical product of the instantaneous fluid flow rate and said variable condition by generating packets of pulses where the exact number of pulses in each packet is related to said condition and the number of packets produced during said long period of time is related to fluid flow; and
   providing a oscillator circuit for generating the individual pulses in said packets,
   said packets of pulses being generated during a time interval commenced in response to flow pulses from said first series of electrical pulses,
   said time interval being terminated by the accumulation of a predetermined number of pulses from said second series of pulses.

2. The method of claim 1 wherein the frequency of said second series of electrical pulses is related to the temperature of the fluid,
   wherein the frequency of the pulses generated by said oscillator circuit is related to the pressure of the fluid, and
   wherein the incremental mathematical product is a manifestation of fluid flow corrected to a standard temperature and pressure.

3. The method of claim 1 wherein the frequency of said second series of electrical pulses is related to two variable conditions of the fluid,
   wherein the frequency of the pulses generated by said oscillator circuit is related to one of said two variable conditions of the fluid in the same manner that said second series of electrical pulses is related to said one variable condition of the fluid, whereby said one variable condition is eliminated as a variable in the summing of the incremental mathematical products.

4. The method as defined in claim 1 comprising the further step of correlating the pulse signals relating to fluid flow and to said variable condition to produce through a subtraction process a directly readable manifestation of the fluid flow compensated by an amount determined by the varying condition of the fluid.

5. The method of measuring fluid flow compensated for a variable condition of the fluid comprising the steps of:
   generating a first series of electrical pulses having a frequency related to fluid flow;
   generating a second series of electrical pulses having a frequency related to a variable condition by which the fluid flow measurement is to be compensated;
   generating a third series of electrical pulses; and
   counting the pulses of the third series of electrical pulses which occur during intervals of time commenced at a time related to the occurrence of a pulse in the first series of electrical pulses and terminated at a time related to the occurrence of a fixed number of pulses in the second series of electrical pulses immediately following commencement of said interval, the accumulation of the counted pulses from said third series providing a measurement of the compensated fluid flow.

6. The method as defined in claim 5 wherein the frequency of the third series of electrical pulses is fixed.

7. The method as defined in claim 5 wherein the frequency of the third series of electrical pulses is related to a second variable condition by which the fluid flow measurement is to be compensated.

8. The method of claim 7 wherein the first condition is the dielectric constant of the fluid and wherein the frequency of the third series of electrical pulses is related to the temperature of the fluid and also to the dielectric constant of the fluid in the same manner as the frequency of the second series of electrical pulses is related to the dielectric constant of the fluid.

9. A fluid flow metering system capable of producing a manifestation of fluid flow compensated for variation in a condition of the fluid comprising:
   means generating flow pulses at a rate related to fluid flow, the interval between successive pulses at maximum flow rate being not less than a predetermined period of time;
   means generating pulses at a rate related to a variable condition of the fluid, the interval between successive pulses at the lowest frequency being at least an order of magnitude greater than the interval between successive flow pulses at maximum flow rate to thereby produce at least ten or more condition related pulses during the time interval between successive flow pulses;
   counting means for accumulating pulses; and
   circuit means responsive to said flow pulses for supplying packets of pulses to said counting means, the precise number of pulses in each of said packets being related to the value of the condition during that particular time interval, said circuit means including a bistable circuit having set and reset terminals, a first gate circuit that is enabled when said bistable circuit is set and disabled when said bistable circuit is reset, a scaler connected between the output of said first gate circuit and the reset terminal for said bistable circuit, means for applying said condition related pulses to the input of said first gate circuit to reset said bistable circuit after the accumulation of a predetermined number of condition related pulses in the interval between successive flow pulses, oscillator means, a second gate circuit, means for applying the output signal from said oscillator means to the input of said second gate circuit and from the output of said second gate circuit to said counting means, and means for enabling said second gate circuit responsively to the duration of the set condition of said bistable circuit.

10. The system as defined in claim 9 wherein said means for applying the output of said second gate circuit to said counting means includes a subtractor circuit having two input terminals and an output terminal, a third scaler connected to one input terminal of said subtractor circuit, and means connecting said output terminal of said subtractor circuit to said counting means, said system further comprising means for applying flow pulses to the other input terminal of said subtractor circuit through a second scaler.

11. The system as defined in claim 10 wherein the values of said second and third scalers are selected to produce an output signal from said subtractor circuit that is directly readable as a fraction of the gross total fluid flow, said system further including a register connected to said flowmeter for providing a gross total fluid flow.

12. The system as defined in claim 9 further having a source of electrical pulses having a frequency related to friction losses in said flow pulse generating means, and means for adding said friction loss pulses to said flow pulses thereby to produce periodically additional packets of pulses.

13. A system for producing a modified manifestation of the digital output of a fluid flowmeter comprising:
a flowmeter for generating a first series of electrical pulses having a frequency related to fluid flow;
a first generator for generating a second series of electrical pulses having a frequency related to the condition for which the output of the flowmeter is to be modified;
a second generator for generating a third series of electrical pulses
counter means for counting electrical pulses; and
gate means responsive to the output of said flowmeter, to the output of said first generator, and to the output of said second generator for passing pulses from said second generator to said counter means to thereby provide a modified manifestation of the digital output of said flowmeter.

14. The system of claim 13 wherein said fluid is a gas, wherein said condition is temperature and wherein the frequency of said third series of electrical pulses is related to the pressure of said gas whereby the manifestation of the digital output of said flowmeter is modified to a standard temperature and pressure.

15. The system of claim 13 wherein the frequency of said third series of electrical pulses is related to two variable conditions of the fluid, and wherein the frequency of said second series of electrical pulses is related to one of said two variable conditions in the same manner as said third series of electrical pulses is related to said one variable condition.

16. The system as defined in claim 13 wherein said first generator includes transducer means disposed to monitor a condition of the fluid passing through said flowmeter means and to detect variations therein; and wherein said gate means comprises:

a flip-flop having a set input terminal connected to the output terminal of said flowmeter;
a scaler having an output terminal connected to the reset input terminal of said flip-flop;
a first AND gate having an output terminal connected to the input terminal of said scaler and an input terminal connected to the output terminal of said first generator;
a second AND gate having an input terminal connected to the output terminal of said second generator and an output terminal connected to said counter means; and
circuit means for connecting the set output terminal of said flip-flop to the other input terminal of said first and second AND gates.

17. The system as defined in claim 13 including a third generator for generating a fourth series of electrical pulses having a frequency variable in response to a second condition of the fluid, and wherein said gate means further includes means for scaling the number of pulses in said third and fourth series of electrical pulses and a subtractor circuit for subtracting said third series of electrical pulses from said fourth series of electrical pulses.

18. A digital system comprising:
a pulse counter;
first and second sources of electrical pulses;
circuit means for applying electrical pulses to said counter during a gating interval;
means for initiating said gating interval in response to a pulse from said first source of electrical pulses and for terminating said gating interval in response to a predetermined number of electrical pulses from said second source of electrical pulses.

19. The digital system of claim 18 including a third source of electrical pulses wherein said second and third sources of electrical pulses comprise substantially identical oscillator circuits each having a variable capacitance element in its frequency determining circuit.

20. The digital system of claim 19 wherein one of said output signal frequency determining capacitance elements is variable in response to a first and second condition and wherein the other of said output signal frequency determining capacitance elements is variable in response to said first condition in a manner related to the response of said one capacitance element to said first condition.

21. The digital system of claim 20 wherein said second condition is related to the constituency of a fluid, wherein said first condition is related to the temperature of said fluid, and
wherein said first source of electrical pulses is responsive to the flow of said fluid.

22. A method of compensating a digital manifestation of a condition for a factor influencing the condition comprising the steps of:
generating a first series of electrical pulses having a frequency related to the factor influencing the condition;
generating a second series of electrical pulses having a frequency related to the factor influenced condition;
counting the pulses in a packet of pulses from one of the series of electrical pulses during a gating interval the duration of which is related to the accumulation of a predetermined number of pulses in the other of the series of electrical pulses.

23. The method of claim 22 wherein the condition is related to the dielectric constant of a fluid; and
wherein the factor influencing the condition is related to the dielectric constant of a second fluid confined in heat transmitting relation to the first mentioned fluid.

24. The method of claim 23 wherein the gating intervals are repeated at a frequency related to the flow of the first mentioned fluid and including the further step of summing the number of pulses in the gating intervals.

25. A system for producing a modified manifestation of the digital output of a fluid flowmeter comprising:
a flowmeter for generating a first series of electrical pulses having a frequency related to fluid flow;
a first generator for generating a signal related to a first condition for which the output of the flowmeter is to be modified;
a second generator for generating a second series of electrical pulses having a frequency related to a second condition for which the output of the flowmeter is to be modified;
a third generator for generating a third series of electrical pulses at a predetermined frequency;
means for counting electrical pulses;
gate means for applying the difference in the number of pulses in said second and third series of electrical pulses to said counter means when enabled; and means responsive to said first series of electrical pulses and to said signal for enabling said gate means.

26. The system of claim 25 wherein said signal is digital, and wherein said gate enabling means includes:
a flip-flop having a set input terminal connected to the output terminal of said flowmeter;
a scaler having an output terminal connected to the reset input terminal of said flip-flop;
a first gate having an output terminal connected to the input terminal of said scaler and an input terminal connected to the output terminal of said first generator; and
means responsive to the setting of said flip-flop for enabling said first gate.

27. The system of claim 25 wherein said fluid is a gas, wherein said first condition is the temperature of said gas and wherein said second condition is the pressure of said gas.

28. The method of measuring fluid flow compensated for two variable conditions of the fluid comprising the steps of:
generating a first series of electrical pulses having a frequency related to fluid flow;
generating a second and third series of electrical pulses related respectively to the first and second conditions of the fluid for which compensation is to be made;
generating a fourth series of electrical pulses at a predetermined frequency; and
counting the difference between the number of pulses in the third and fourth series of electrical pulses during periods of time related in frequency to flow and in duration to the number of pulses in the second series of electrical pulses.

29. The method of claim 28 wherein the periods of time are initiated by a pulse in the first series of electrical pulses and terminated by the accumulation of a predetermined number of pulses in the second series of electrical pulses.

30. The method of claim 29 wherein the fluid is gas, wherein the first condition is the temperature of the gas, and wherein the second condition is the pressure of the gas.

31. The method of producing a directly readable, modified manifestation of the digital output of a fluid flowmeter comprising the steps of:
generating a first series of electrical pulses having a frequency related to fluid flow which varies from zero to a predetermined maximum;
generating a stop signal which occurs at a time related to a factor by which the fluid flow manifestation is to be modified;
generating packets of pulses which are commenced in response to a pulse in said first series of pulses and terminated in response to said stop signal; and producing the modified manifestation at the output of a subtractor circuit supplied with pulses related to the fluid flow and pulses related to the pulses occurring in said pulse packets.

32. A system for producing a modified manifestation of the digital output of a fluid flowmeter comprising:
a flowmeter for generating a digital signal having a frequency related to fluid flow;
a transducer for generating a signal related to a variable physical condition for which the signal from the flowmeter is to be modified;
a generator for generating a digital signal;
counter means for counting electrical pulses; and,
gate means connected to receive the signals from said flowmeter, from said transducer and from said generator for intermittently applying pulses related to the pulses in the digital signal output of said generator to said counter means as packets of pulses, the number of pulses in said intermittent digital signal being related in number to the output of said flowmeter modified as a function of the output of said transducer.

33. The system of claim 32 wherein each of the packets of pulses in the digital signal intermittenly applied to said counter means is initiated in response to a pulse in the digital signal from said flowmeter.

34. The system of claim 33 wherein each of said packets of pulses contains at least 100 pulses.

35. A method for producing a modified manifestation of the digital output of a fluid flowmeter comprising the steps of;
generating a digital signal having a frequency related to fluid flow;
generating a signal related to a variable physical condition for which the signal from the flowmeter is to be modified;
generating a series of pulses; and,
generating packets of pulses in response to the flow related signal, the condition related signal and the series of pulses where the number of packets is related to fluid flow and where the number of pulses in each packet is related to the condition for which the flow responsive signal is to be modified.

36. The method of claim 35 wherein each of the packets of pulses contains at least 100 pulses.

37. The method of claim 35 wherein the series of pulses is related in frequency to a second variable physical condition of the fluid.

38. A method for producing a modified manifestation of a fluid flowmeter comprising the steps of:
generating a first signal related to fluid flow and variable by at least 10 percent;
generating a second signal related to a variable physical condition of the fluid and variable by at least 10 percent;
generating a third signal independently of the first and second signals; and,
generating a fourth signal responsively to the first, second and third signals, said fourth signal comprising packets of pulses wherein the number of packets is related to fluid flow, wherein the number of pulses in each packet is at least 10 and is related to the condition.

39. The method of claim 38 wherein each of the pulses in the fourth signal corresponds to a pulse in the third signal.

40. The method of claim 39 wherein the third signal is related to a second variable physical condition of the fluid.

41. The method of claim 38 wherein the third signal is related to two variable physical conditions of the fluid, the third signal varying responsively to one of the two variable conditions in the same manner as the second signal varies responsively to said variable condition.

42. A system for producing a modified manifestation of the digital output signal of a fluid flowmeter comprising:
flowmeter means for providing a first series of pulses having a frequency related to fluid flow;
first means for providing a second series of pulses;
second means for providing a signal related to the variable physical condition for which the output signal of the flowmeter is to be modified;
means for counting electrical pulses; and,
gate means responsive to said flowmeter means, to said first means, and to said second means for providing packets of pulses to said counting means wherein the number of packets is related to fluid flow and wherein the number of pulses in each packet is related to the condition for which the flowmeter output signal is to be modified, the number of pulses in said packets of pulses being related to fluid flow modified as a function of a variable physical condition of the fluid.

43. The system of claim 42, wherein said fluid is a gas, wherein said condition is temperature and wherein the frequency of said second series of pulses is related to the pressure of said gas whereby the manifestation of the output signal of said flowmeter is modified to a standard temperature and pressure.

44. The system of claim 42 wherein said second generator is responsive to two variable conditions of the fluid, and wherein said first generator is responsive to one of said two variable conditions in the same manner as said second generator is responsive to said one variable condition.

45. Apparatus comprising:
a pulse counter;
a condition responsive signal generator;
first and second sources of pulses;
means connected to said generator and to said sources for applying pulses from said second source to said counter during a gating interval;
means for initiating said gating interval in response to a pulse from said first source of pulses and for terminating said gating interval in response to said condition responsive signal generator.

46. A method of compensating a digital manifestation of a condition for a factor influencing the condition comprising the steps of:
providing a first signal related to the factor influencing the condition;
providing a second signal related to the factor influenced condition;
providing a digital signal; and,
counting the pulses in the digital signal during a plurality of gating intervals related in number to the second signal and related in duration to said first signal.

47. The method of claim 46 wherein the condition is fluid flow; and,
wherein the factor influencing the condition is related to the dielectric constant of the fluid.

48. A method for producing a modified manifestation of the digital output of a fluid flowmeter comprising the steps of:
generating a digital signal having a frequency related to fluid flow;
generating a signal related to a variable physical condition for which the signal from the flowmeter is to be modified;
generating a series of pulses at least an order of magnitude greater in pulse repetition rate than the pulse repetition rate of the pulses in the digital signal; and,
counting the pulses which occur in the series of pulses in a sampling interval initiated responsively to the flow related signal and terminated responsively to the condition related signal.

49. The method of claim 48 wherein each of the sampling intervals contains at least 100 pulses.

50. The method of claim 48 wherein the series of pulses is related in pulse repetition rate to a second variable physical condition of the fluid.

51. A method for producing a modified manifestation of a fluid flowmeter comprising the steps of:
generating a first signal related to fluid flow and variable by at least ten percent;
generating a second signal related to a variable physical condition of the fluid and variable by at least ten percent;
generating a third signal independently of the first and second signals; and,
generating a fourth signal responsively to the first, second and third signals, said fourth signal comprising packets of pulses wherein the number of packets is related to fluid flow, wherein the number of pulses in each packet is at least ten and is related to the condition.

52. The method of claim 51 wherein each of the pulses in said fourth signal corresponds to a pulse in the third signal.

53. The method of claim 52 wherein the third signal is related to a second variable physical condition of the fluid.

54. The method of claim 51 wherein the third signal is related to two variable physical conditions of the fluid, the third signal varying responsively to one of the two variable conditions in the same manner as the second signal varies responsively to said variable condition.

* * * * *